United States Patent [19]
Dahl et al.

[11] 3,729,911
[45] May 1, 1973

[54] ROTARY LAWN MOWER WITH SAFETY FEATURES

[75] Inventors: Einar S. Dahl; Earl H. Kidd, both of Galesburg, Ill.

[73] Assignee: Outboard Marine Corporation, Waukegan, Ill.

[22] Filed: Apr. 3, 1972

[21] Appl. No.: 240,476

[52] U.S. Cl. ............................................. 56/320.2
[51] Int. Cl. ............................................. A01d 67/00
[58] Field of Search .................. 56/320.2, 13.3, 13.4, 56/17.4, 17.5

[56] References Cited

UNITED STATES PATENTS

| | | | |
|---|---|---|---|
| 2,864,226 | 12/1958 | Bright | 56/13.4 |
| 3,646,740 | 3/1972 | Grimes | 56/302.2 |
| 3,648,445 | 3/1972 | Efflandt | 56/320.2 |
| 3,667,199 | 6/1972 | Bloom | 56/320.2 |
| 2,969,634 | 1/1961 | Lannert | 56/13.4 |
| 3,118,267 | 1/1964 | Shaw | 56/17.5 |
| 3,509,703 | 5/1970 | Kunz | 56/17.4 |

*Primary Examiner*—Russell R. Kinsey
*Attorney*—Robert E. Clemency et al.

[57] ABSTRACT

Disclosed herein is a rotary lawn mower including a discharge chute of inverted U-shape form and including spaced side walls and an upper portion including a downwardly projecting central portion extending in the middle between the side walls and increasing in width in the direction between the side walls with increasing distance from the periphery of the path of the cutter blade, and decreasing in height above the ground with increasing distance from the periphery of the path of the cutter blade. In addition, the lawn mower includes a protective bar extending across the discharge chute in spaced relation below the upper discharge chute wall and including an arcuate portion located adjacent to the periphery of the cutter blade path. In one embodiment, the radial distance between the bar and the periphery of the cutter blade path decreases in the direction of rotation of the cutter blade. Still further, the bar includes a surface extending adjacent to the periphery of the cutter blade path and in inclined, radially outward and downward relation to the periphery of the cutter blade path.

12 Claims, 4 Drawing Figures

Patented May 1, 1973 3,729,911
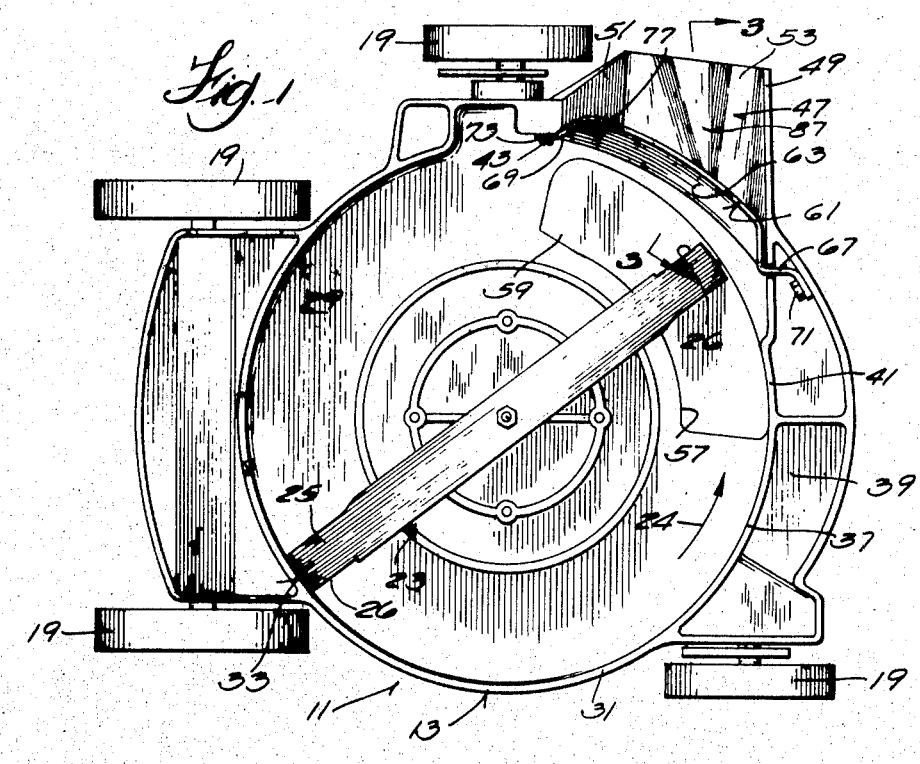
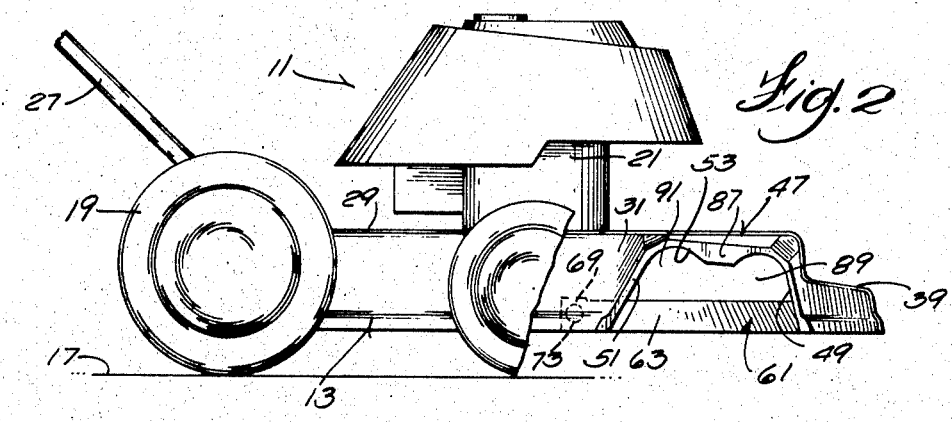
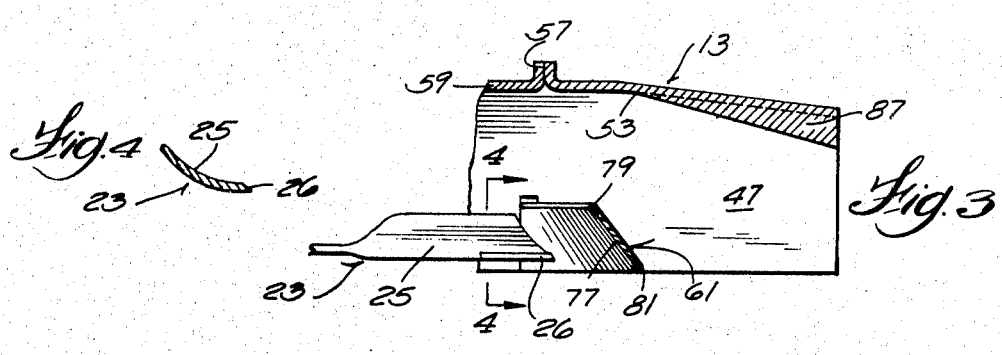

ROTARY LAWN MOWER WITH SAFETY FEATURES

BACKGROUND OF THE INVENTION

The invention relates to rotary lawn mowers and more particularly to rotary lawn mowers with generally horizontally extending discharge chutes. One example of one such rotary lawn mower is disclosed in the Shaw U.S. Pat. No. 3,118,267 issued Jan. 21, 1964. The invention further relates to arrangements for preventing projection at a high velocity of solid articles through such discharge chutes, to arrangements for deflecting objects downward as they are discharged through such discharge chutes and to arrangements for preventing or at least diminishing the possibility of inadvertent contact with the cutter blade through the discharge chute by the operator's foot or hand.

Examples of prior rotary mowers including arrangements for preventing high velocity projection of solid articles through discharge chutes and for minimizing the possibility of contact with the cutter blade by the hand or foot of the user are disclosed in the Irgens U.S. Pat. No. 3,420,041 issued Jan. 7, 1969, and the Heidner et al. U.S. Pat. No. 3,453,821 issued July 8, 1969. Employment of arrangements for changing the direction of grass clipping movement have been successful in some respects but such arrangements often have a tendency to clog the discharge chute under some conditions.

SUMMARY OF THE INVENTION

The invention provides a rotary mower including a horizontally extending discharge chute provided with a protective bar which extends at least partially across the discharge chute in spaced relation below the upper wall of the discharge chute and in closely adjacent radial relation to the periphery of the cutter blade path.

The invention further provides a rotary mower including a horizontally extending discharge chute provided with a protective bar which can extend less than the full distance across the discharge chute and which can be secured to one of the depending walls of the discharge chute and in spaced relation below the upper wall of the discharge chute and in closely adjacent radial relation to the periphery of the cutter blade path.

The invention further provides a rotary mower including a horizontally extending discharge chute provided with a protective bar across the discharge chute in the plane of the cutting blade and in closely adjacent radial relation to the periphery of the cutter blade path.

Preferably, the protective bar includes a radially inner surface which extends in adjacent relation to the periphery of the cutter blade path and which is inclined radially outwardly and downwardly and which extends from above to below the cutter blade path and arcuately such that the radial distance from the periphery of the cutter blade path to the protective bar diminishes in the direction of cutter blade rotation. Such diminishing radial distance serves to reduce or prevent clogging, as the closely adjacent movement of the cutter blade relative to the protective bar serves to clean the protective bar of grass. Alternatively, at least some of the advantages of the invention can be obtained when the radial distance from the periphery of the cutter blade path to the protective bar is either uniform or increases in the direction of cutter blade rotation.

Also in accordance with the invention, the upper or top wall of the discharge chute is provided with a downwardly projecting centrally located member adapted to prevent undesirable entry of the user's hand or foot into the chute. In the preferred form of the invention, the discharge chute is provided with a downwardly projecting central or blocking portion which increases in width with increasing distance from the periphery of the cutter blade path and which decreases in height above the ground with increasing distance from the periphery of the cutter blade path. The central portion of the top discharge chute wall, together with the chute side walls, define spaced tunnels for travel of the grass clippings in adjacent relation to the forwardly and rearwardly located side walls. Preferably, the central top wall portion and the side walls are contoured so as to provide each of the tunnels with downwardly concave upper surfaces.

Preferably, the protective bar of the invention and the chute configuration of the invention are employed together to maximize safety with minimum restriction to cut grass discharge through the discharge chute.

One of the principal objects of the invention is the provision of a lawn mower which is designed to prevent inadvertent contact with the cutter bar through the discharge chute by the hand or foot of the user.

Another principal object of the invention is the provision of a lawn mower which includes a protective bar extending across the discharge chute below the top wall thereof and in closely adjacent relation to the periphery of the cutter blade.

Another principal object of the invention is the provision of a lawn mower which includes a protective bar extending less than the full distance across the discharge chute below the top wall thereof and in closely adjacent relation to the periphery of the cutter blade.

Another principal object of the invention is the provision of a lawn mower which includes a protective bar extending across the discharge chute in the plane of the cutting blade and in closely adjacent relation to the periphery of the path of the cutting blade so as to obstruct the projection of solid objects which have been struck squarely by the leading edge of the blade and therefore have the highest velocity.

Another of the principal objects of the invention is the provision of a lawn mower as described in the foregoing paragraph and in which the protective bar includes a surface which is adjacent to the periphery of the cutter blade path and extends in inclined relation radially outwardly and downwardly so as to downwardly deflect solid objects projected by the cutter blade without materially adversely affecting cut grass delivery through the discharge chute. In this regard, cut grass is readily blown out the discharge chute above the protective bar.

Another of the principal objects of the invention is the provision of a rotary blade housing including a discharge chute configuration which has a minimum adverse affect on grass delivery therethrough while simultaneously affording an effective obstacle to inadvertent contact with the cutter blade, through the discharge chute, of the user's hand or foot.

Still another of the principal objects of the invention is the provision of a rotary lawn mower housing including a discharge chute configuration including an upper wall having a central portion which increases in width and decreases in height above the ground with increasing distance from the periphery of the cutter blade path.

Still another object of the invention is the provision of a rotary lawn mower housing including both a protective bar and a discharge chute configuration in accordance with the invention.

Still another object of the invention is the provision of a rotary mower housing including both a protective bar and a discharge chute configuration including an upper wall having a central portion which increases in width and decreases in height above the ground with increasing distance from the periphery of the cutter blade path such that the overall width of the mower housing, including the discharge chute, is not increased, notwithstanding employment of the protective bar or the downwardly extending central portion of the discharge chute.

Other objects and advantages of the invention will become known by reference to the following description and claims and the accompanying drawings.

DRAWINGS

FIG. 1 is a bottom view of a rotary mower embodying various of the features of the invention.

FIG. 2 is a partially broken away side elevational view of the rotary mower shown in FIG. 1.

FIG. 3 is an enlarged sectional view taken along line 3—3 of FIG. 1.

FIG. 4 is a sectional view taken along line 4—4 of FIG. 3.

Before explaining the invention in detail, it is to be understood that the invention is not limited in its application to the details of construction and arrangements of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Shown in the drawings is a rotary lawn mower 11 including a blade housing 13 which is supported in spaced relation above the ground 17 (FIG. 2) and for travel along the ground 17 by a plurality of wheels 19. The blade housing 13 supports a prime mover 21 which can be an internal combustion engine and which includes an output shaft carrying a cutter blade 23 rotatable in the direction shown by the arrow 24 in a generally horizontal plane. Various cutter blade configurations can be employed. In the illustrated construction, the cutter blade 23 includes diametrically opposed tip portions 25 which respectively include cutting edges 26 and which, rearwardly in the direction of rotation from the cutting edges 26, are curved arcuately upwardly as shown in FIG. 4.

The blade housing 13 has connected thereto, at the rear, a fragmentarily illustrated handle 27 and includes an upper or top deck 29 located above the cutter blade 23 and an annular or circular wall 31 which depends from the top deck 29 and extends in adjacent relation to the periphery of the cutter blade path. While other arrangements could be employed, in the specifically illustrated construction, the spacing from the radially outer tip 33 of the cutter blade 23 to the circular wall 31 can be about between one-fourth and one-half inch. In addition, the annular or circular wall 31 extends somewhat below the plane of cutter blade movement. While other arrangements could be employed, in the specifically illustrated construction, the circular wall 31 extends below the cutter blade path for a distance of about between one-fourth and one-half inch, in the area of from about 1:30 o'clock to about 9 o'clock when viewed from the underside of blade housing 13 as shown in FIG. 1 (12 o'clock being at the front of the mower). At the front of the mower, i.e., from about 10:30 o'clock to about 1:30 o'clock, the vertical height of the circular wall 31 terminates so that the bottom edge 37 is slightly above the plane of rotary cutter blade movement. While other arrangements could be employed, in the illustrated construction, the bottom edge 37 is approximately about one-half inch above the plane of rotary cutter blade movement. However, as can be readily seen from FIGS. 1 and 2, there extends, forwardly of the arcuate wall 31, in the area from about 10:30 o'clock to about 1:30 o'clock, a forwardly extending guard or brow structure 39 which can extend downwardly to a position below the plane of rotary cutter movement so as to assist in preventing unwanted forward projection of articles outwardly from under the housing by the cutter blade.

The annular or circular wall 31 is interrupted between about 9 o'clock and about 12 o'clock and terminates with end portions 41 and 43 which are arcuately spaced at about 80°. Extending from the end portions 41 and 43 of the arcuate wall 31 is a discharge chute 47 including spaced forwardly and rearwardly located side walls 49 and 51, respectively, and an upper wall 53 which connects the side walls 49 and 51 and can extend either from the top deck 29 or from an annular wall portion extending between the end portions 41 and 43 and downwardly from the top deck 29 above the opening in the annular wall 31 defined by the end portions 41 and 43.

The forward chute side wall 49 extends almost tangentially from the front of the depending arcuate wall 31, i.e., from about 12 o'clock, but at a slightly rearward angle, and the rearward chute side wall 51 extends generally transversely to the path of intended rearward mower travel. Thus, the chute side walls 49 and 51 converge slightly.

The top deck 29 is also provided with a top opening 57 which can be removably closed with a cover 59 and is more fully disclosed in the Shaw U.S. Pat. No. 3,118,267 issued Jan. 21, 1964.

As thus far described, the construction of the blade housing 13 is conventional.

In accordance with the invention and in order to provide increased protection against injury to the user by reason of possible contact with the cutter blade 23 through the discharge chute 47, there is provided a protective bar or member 61 which extends between the annular wall end portions 41 and 43 in the area of the plane of rotary cutter blade movement.

The protective bar 61 includes a centrally located and arcuately extending guard portion 63 and two end portions or parts 67 and 69 which can be connected to the blade housing 13 by any suitable means. Although other arrangements can be employed, in the particularly illustrated construction, the forwardly located end portion 67 includes an ear which is apertured for passage therethrough of a bolt 71 which is threaded into the blade housing 13. Similarly, the rearwardly located end portion 69 is apertured for passage therethrough of a bolt 73 which is threaded into the blade housing 13, thereby to mount the protective bar 61 to the blade housing 13.

In accordance with the invention, the arcuately extending guard portion 63 extends between the annular wall end portions 41 and 43 and in adjacent relation to the periphery of the cutter blade path and in such manner that the radial distance from the periphery of the cutter blade path to the arcuately extending guard portion 63 decreases in the direction of cutter blade rotation. While other specific constructions can be employed, in the illustrated construction, such radial distance diminishes slightly from about seven-eighths inch to about one-half inch. Alternatively, at least some of the advantages of the invention can be obtained when such radial distance is either uniform or slightly increases in the direction of cutter blade rotation.

The guard portion 63 also includes an inner surface 77 which extends adjacent to the periphery of the cutter blade path and from above to below the plane of cutter blade rotation and which, in horizontal cross section, is arcuate and, in vertical cross section, extends in inclined relation radially outwardly and downwardly. The surface 77 includes an upper edge 79 which extends radially outwardly of and above the periphery of the cutter blade path and a lower edge 81 which extends radially outwardly of and below the periphery of the cutter blade path. As indicated earlier, the radial distance of the upper and lower edges 79 and 81 from the periphery of the cutter blade path decreases in the direction of cutter blade rotation.

While other constructions are possible in the illustrated construction, the length of the surface between the upper and lower edges 79 and 81 is such that the upper edge 79 is located at least adjacent to and preferably above the periphery of the upper edge of the cutter blade path and such that the lower edge 81 is located below the periphery of the lower edge of the rotary path of the cutter blade 23.

Employment of the disclosed protective bar 61 serves to block contact by the hand or foot of a user with the cutter blade 23 while avoiding undesirable reduction or restriction in the capacity of the discharge chute 47 to handle or convey the cut grass discharge from the blade housing 13. The downward and outward inclination of the surface 77 of the central guard portion 63 of the protective bar 61 serves to deflect downwardly any solid article propelled outwardly of the discharge chute by the cutter blade 23 and to thereby prevent such outward projection of solid articles. In addition, the approach of the upper edge 79 of the protective bar 61, in the direction of blade movement, toward and into close proximity to the path of the cutter blade periphery, serves to prevent substantial "hang up" of cut grass on the protective bar 61 by facilitating travel of such hung up clippings toward the rearward end of the protective bar 61 where such clippings can be more readily removed by action of the cutter blade 23 due to the greater proximity of the cutter blade 23 to the protective bar 61.

Also in accordance with the invention, the discharge chute 47 is contoured to restrict entrance therein of a hand or foot without materially adversely affecting the grass clipping discharge capacity of the chute. Various arrangements can be employed, as for instance, a pin or other member can extend downwardly from the central part of the upper discharge chute wall. In the illustrated construction, the upper wall 53 of the discharge chute 47 is provided with a downwardly projecting central portion 87 which is located in the middle between the side walls 49 and 51, and which tapers outwardly from the periphery of the cutter blade path, i.e., which has a width which increases with increasing distance from the periphery of the cutter blade path. In addition, the central portion 87 is formed so that the height of the central portion 87 above the ground diminishes with increasing distance from the periphery of the cutter blade path. The general shape of the upper discharge chute wall 53 is thereby divided by the central portion 87 into forwardly and rearwardly located tunnels 89 and 91, respectively. Preferably, the upper surfaces which define the central portion 87, as well as the tunnels 89 and 91, are formed with a downwardly concave shape so as to facilitate grass clipping discharge.

As a result of the foregoing described construction, the central portion 87 provides an obstacle to entry of the operator's foot or hand into the discharge chute 47 without materially adversely affecting delivery of cut grass from the discharge chute 47 in the tunnels or areas 89 and 91 to the side of and beneath the central portion 87.

The chute configuration just described can be provided by adding an insert to a discharge chute having a generally rectangular cross section between the chute side walls or alternatively, the disclosed configuration can be integrally provided in the blade housing.

Both of the protective bar 61 and the configuration of the discharge chute 47 provide increased safety and, although each can be separately used to obtain at least some of the advantages of the invention, it is preferred to simultaneously employ both the protective bar and the disclosed chute contour. In this regard, when a discharge chute with a depending central portion 87 and the protective bar 61 are both employed, a somewhat smaller protective bar can be employed, thereby maximizing avoidance of any restriction by the protective bar to grass clipping discharge through the discharge chute.

Various of the features of the invention are set forth in the following claims.

What is claimed is:

1. A rotary lawn mower comprising a rotary blade housing including a top deck, a circular wall depending from said top deck and having an arcuate extent less that 360° and terminating with arcuately spaced end portions, a plurality of wheels mounted on said housing for supporting said housing for travel in spaced relation above the ground, a cutter blade supported by said housing for rotary movement within said housing and being dimensioned such that the periphery of the path of cutter blade travel is adjacent to said circular wall, means defining a discharge chute extending from said arcuately spaced end portions of said circular wall and including a top wall and an outer end spaced radially outwardly from the path of said cutter blade, and a bar extending at least partially between said end portions of said circular wall in downwardly spaced relation from said top wall of said discharge chute and including an arcuate portion extending adjacent to the periphery of the path of said cutter blade in inclined radially outward and downward relation to the periphery of the path of said cutter blade.

2. A rotary lawn mower comprising a rotary blade housing including a top deck, a circular wall depending from said top deck and having an arcuate extent less than 360° and terminating with arcuately spaced end portions, a plurality of wheels mounted on said housing for supporting said housing for travel in spaced relation above the ground, a cutter blade supported by said housing for rotary movement within said housing and being dimensioned such that the periphery of the path of cutter blade travel is adjacent to said circular wall, means defining a discharge chute which is generally of inverted U-shape form and which includes spaced side walls and a top wall extending between said side walls and including a downwardly projecting central portion extending in the middle between said side walls, and a bar extending at least partially between said end portions of said circular wall in downwardly spaced relation from said top wall of said discharge chute.

3. A rotary lawn mower in accordance with claim 1 wherein said bar is positioned relative to said cutter blade so that the space between the path of said cutter blade and said arcuate bar portion decreases in the intended direction of cutter blade rotation.

4. A rotary lawn mower in accordance with claim 1 wherein said arcuate bar portion includes an upper edge located radially outwardly and above the periphery of the path of said cutter blade.

5. A rotary lawn mower in accordance with claim 1 wherein said blade includes an outer tip and said arcuate bar portion includes a surface extending adjacent to the upper edge of the periphery of the path of such blade tip.

6. A rotary lawn mower in accordance with claim 1 wherein said arcuate bar portion includes a lower edge located radially outwardly of and below the periphery of the path of said cutter blade.

7. A rotary lawn mower comprising a rotary blade housing including a top deck, a circular wall depending from said top deck and having an arcuate extent less than 360° and terminating with arcuately spaced end portions, a plurality of wheels mounted on said housing for supporting said housing for travel in spaced relation above the ground, a cutter blade supported by said housing for rotary movement within said housing, and means defining a discharge chute extending from said arcuately spaced end portions of said circular wall, said discharge chute being generally of inverted U-shape form and including spaced side walls having upper margins and an upper wall extending between said upper margins of said side walls and including a downwardly projecting central portion extending in approximately the middle between said side walls.

8. A rotary lawn mower in accordance with claim 7 and further including a bar extending between said end portions of said circular wall in downwardly spaced relation from said upper wall of said discharge chute.

9. A rotary lawn mower in accordance with claim 7 wherein said central portion increases in width in the direction between said side walls with increasing distance from the periphery of the path of said cutter blade.

10. A rotary lawn mower in accordance with claim 7 wherein said central portion decreases in height above the ground with increasing distance from the periphery of the path of said cutter blade.

11. A rotary lawn mower comprising a rotary blade housing including a top deck, a circular wall depending from said top deck and having an arcuate extent less than 360° and terminating with arcuately spaced end portions, a plurality of wheels mounted on said housing for supporting said housing for travel in spaced relation above the ground, a cutter blade supported by said housing for rotary movement within said housing and being dimensioned such that the periphery of the path of cutter blade travel is adjacent to said circular wall, means defining a discharge chute extending from said arcuately spaced end portions of said circular wall, said discharge chute being generally of inverted U-shape form and including spaced side walls and an upper wall extending between said side walls and including a downwardly projecting central portion extending in the middle between said side walls, said central portion increasing in width in the direction between said side walls with increasing distance from the periphery of the path of said cutter blade, and said central portion also decreasing in height above the ground with increasing distance from the periphery of the path of said cutter blade, a bar extending between said end portions of said circular wall in downwardly spaced relation from said upper discharge chute wall and including an arcuate portion located adjacent to the periphery of the path of said cutter blade.

12. A rotary lawn mower comprising a rotary blade housing including a top deck, a circular wall depending from said top deck and having an arcuate extent less than 360° and terminating with arcuately spaced end portions, a plurality of wheels mounted on said housing for supporting said housing for travel in spaced relation above the ground, a cutter blade supported by said housing for rotary movement within said housing and being dimensioned such that the periphery of the path of cutter blade travel is adjacent to said circular wall, means defining a discharge chute extending from said arcuately spaced end portions of said circular wall, said discharge chute being generally of inverted U-shape form and including spaced side walls and an upper wall extending between of said side walls and including a downwardly projecting central portion extending in the middle between said side walls, said central portion increasing in width in the direction between said side walls with increasing distance from the periphery of the path of said cutter blade, and said central portion also decreasing in height above the ground with increasing distance from the periphery of the path of said cutter blade, a bar extending between said end portions of said circular wall in downwardly spaced relation from said upper discharge chute wall and including an arcuate portion located adjacent to the periphery of the path of said cutter blade and such that the radial distance between said bar and the periphery of the path of said cutter blade decreases in the direction of cutter blade rotation, said bar including a surface extending adjacent to the periphery of the path of said cutter blade, and in inclined radially outward and downward relation to the periphery of the path of said cutter blade, and including a lower edge located radially outwardly of and below the periphery of the path of said cutter blade and an upper edge located radially outwardly and above the periphery of the path of said cutter blade.

* * * * *

CERTIFICATE OF CORRECTION

Patent No. 3,729,911   Dated May 1, 1973

Inventor(s) Einar S. Dahl et al

It is certified that error appears in the above-identified patent and that said Letters Patent are hereby corrected as shown below:

Abstract, line 3; delete "portion", insert ---wall---

Column 8, line 53; delete "of"

Signed and sealed this 27th day of November 1973.

(SEAL)
Attest:

EDWARD M. FLETCHER, JR.
Attesting Officer

RENE D. TEGTMEYER
Acting Commissioner of Patents